(No Model.)
J. C. C. DAVOL.
FEED WATER HEATER.
No. 424,764. Patented Apr. 1, 1890.
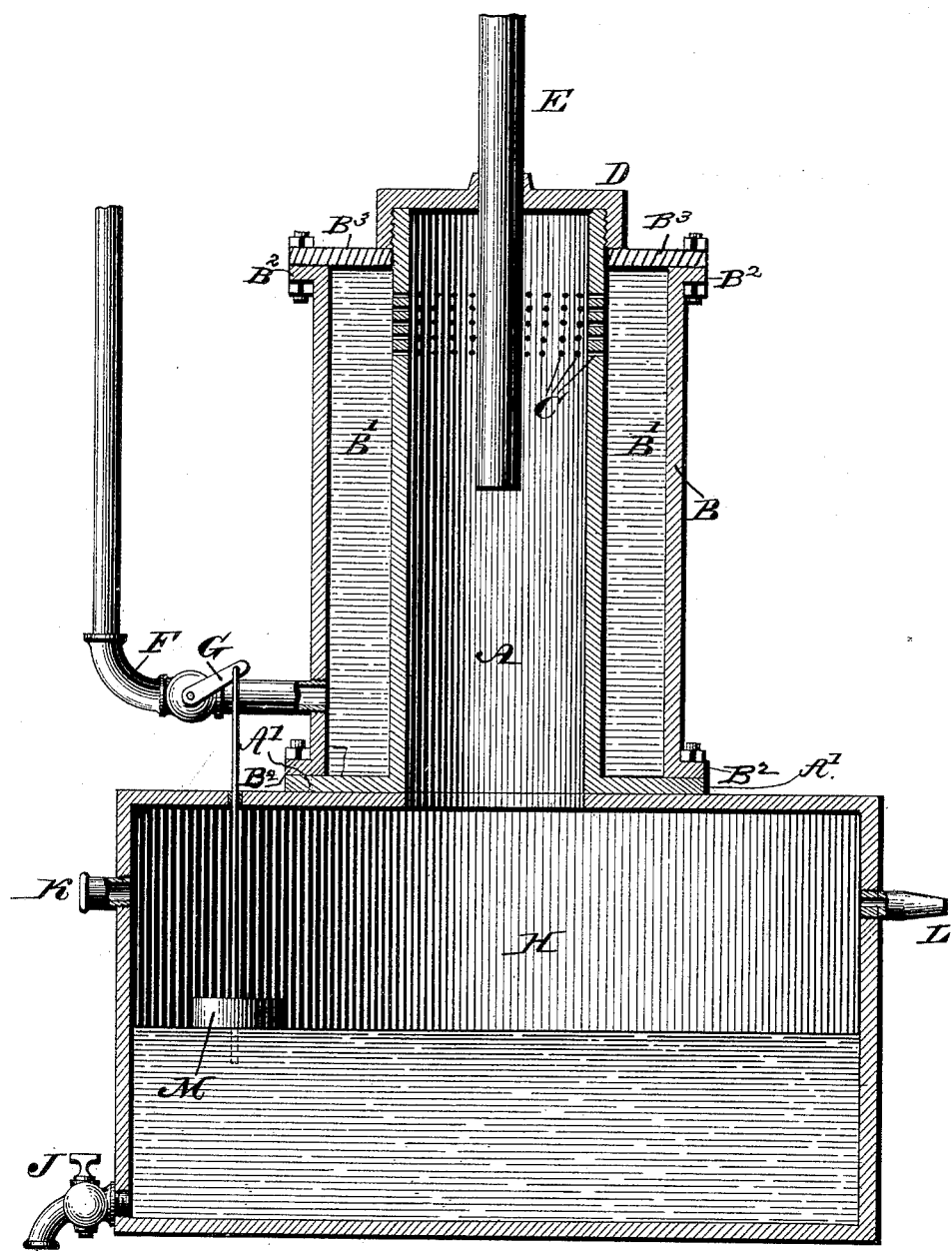
WITNESSES:
P. V. Nagle.
L. Douville.
INVENTOR:
James C. C. Davol
BY John A. Wiederscheim
ATTORNEY.

UNITED STATES PATENT OFFICE.

JAMES C. C. DAVOL, OF FALL RIVER, MASSACHUSETTS.

FEED-WATER HEATER.

SPECIFICATION forming part of Letters Patent No. 424,764, dated April 1, 1890.

Application filed July 11, 1889. Serial No. 317,136. (No model.)

*To all whom it may concern:*

Be it known that I, JAMES C. C. DAVOL, a citizen of the United States, residing at Fall River, in the county of Bristol and State of Massachusetts, have invented a new and useful Improvement in Feed-Water Heaters, which improvement is fully set forth in the following specification and accompanying drawing.

My invention relates to a water-heater wherein exhaust-steam is employed as a heat-generating medium.

The invention consists of a cylinder constituting a heating-chamber surrounded by a jacket, forming a communicating water-chamber, and a pipe for exhaust-steam entering said heating-chamber.

The invention further consists of other novel features, as will be hereinafter set forth.

The figure of the drawing represents a vertical section of a water-heater embodying my invention.

Referring to the drawing, A designates a cylinder, and B a jacket surrounding the same, said cylinder having a flange A' and plate B³, a water-chamber B' thus being produced between the jacket and the cylinder. Apertures C are formed in said cylinder, providing means of communication between said chambers. The cylinder has at top a cap D, which is screwed or otherwise fastened thereto, and formed with an aperture for the entrance of an exhaust-steam pipe E, which projects below the apertures C in said cylinder. The water-chamber has an inlet or supply pipe F attached to the jacket B, which is provided with an automatic valve G, hereinafter more fully referred to.

The bottom of the cylinder A is open and supported over an aperture formed in a tank or other receptacle H, having an outlet J, an overflow K, and a vent L. A float M is also located in said tank, and has a stem which is attached to the valve G of the pipe F for automatically regulating the supply of water to the chamber.

The steam from pipe E fills the space between the apertures C in cylinder A to the water-line in tank H, and the water passing through said apertures C in the form of spray falls through said column of steam and becomes highly heated, in which condition it enters the tank. During the passage of cold water from the water-chamber through the steam more or less of the latter will be condensed and drop into the tank in the form of hot water.

The steam in the heating-chamber formed by cylinder A will be continuously replenished by the incoming charges from pipe E. When the water in the tank rises, the float is elevated therewith, thus operating the valve G and cutting off the supply of water to the chamber B'.

When the supply-water in the tank decreases, the float falls and opens said valve, thus replenishing said chamber B', the effect of which is evident.

The steam in the tank is discharged through vent L, thus preventing back-pressure. The overflow K is for relieving the tank H of surplus water entering therein above a certain level. It will be noticed that the closing of the valve G does not stop the passage of the water to chamber B' above the apertures thereof into the cylinder, and thus into the tank H, and this quantity may overflow from the said tank. In case of leakage the same would result, and hence allowance is made for such additional influx of water after the valve G has been shut off. The heated water may be drawn therefrom, as desired, or conveyed by suitable pipes, or in any other manner, to place of service.

Having thus described my invention, what I claim as new, and desire to secure by Letters Patent, is—

1. A water-heater consisting of a cylinder having apertures in the walls thereof, and provided with a flange A' and a plate B³ at opposite ends, the jacket B, with the flanges B², said jacket, plate, and cylinder being joined at said flanges, forming the water-chamber B', a steam-pipe leading into said cylinder at its upper end and extending below said apertures, a water-inlet pipe leading into said jacket, and a tank below said cylinder and in communication therewith, said parts being combined substantially as described.

2. A water-heater consisting of a cylinder with apertures in its side, a jacket surrounding said cylinder, forming a water-chamber between it and the cylinder, a pipe leading into said water-chamber, an exhaust-steam pipe leading into the cylinder from the top and extending below the apertures in the sides of the cylinder, a tank below said cylinder and in communication therewith, a float in said tank, connected with and operating a cock in said inlet-pipe of said water-chamber, said parts being combined substantially as described.

3. A water-heater consisting of a cylinder with apertures in its side, a jacket surrounding said cylinder and forming a water-chamber between them, a pipe leading into the base of said chamber, and a steam-exhaust pipe leading into the cylinder, a tank below said cylinder and water-chamber and communicating with the interior of the cylinder, a float in said tank connected with a faucet in the inlet-pipe of the water-chamber, an outlet-opening in said tank, and an air-vent therein, said parts being combined substantially as described.

4. A water-heater consisting of an inner heating-chamber surrounded by a cold-water chamber and communicating with the latter by apertures formed in the upper part of the dividing-wall of said chambers, a supply-pipe for said water-chamber, having a valve therein, an exhaust-steam pipe extending downward through the heating-chamber to a point below said chambers, into which the bottom of the heating-chamber opens, and having an overflow and a vent, and a float in said tank having a stem connected with said valve, substantially as described.

JAS. C. C. DAVOL.

Witnesses:
ALBERT WINSLOW, Jr.,
WM. MARTLAND.